Jan. 14, 1947.　　　A. WEISS ET AL　　　2,414,217
INTERNAL-COMBUSTION ENGINE
Filed Nov. 17, 1942　　　2 Sheets-Sheet 1
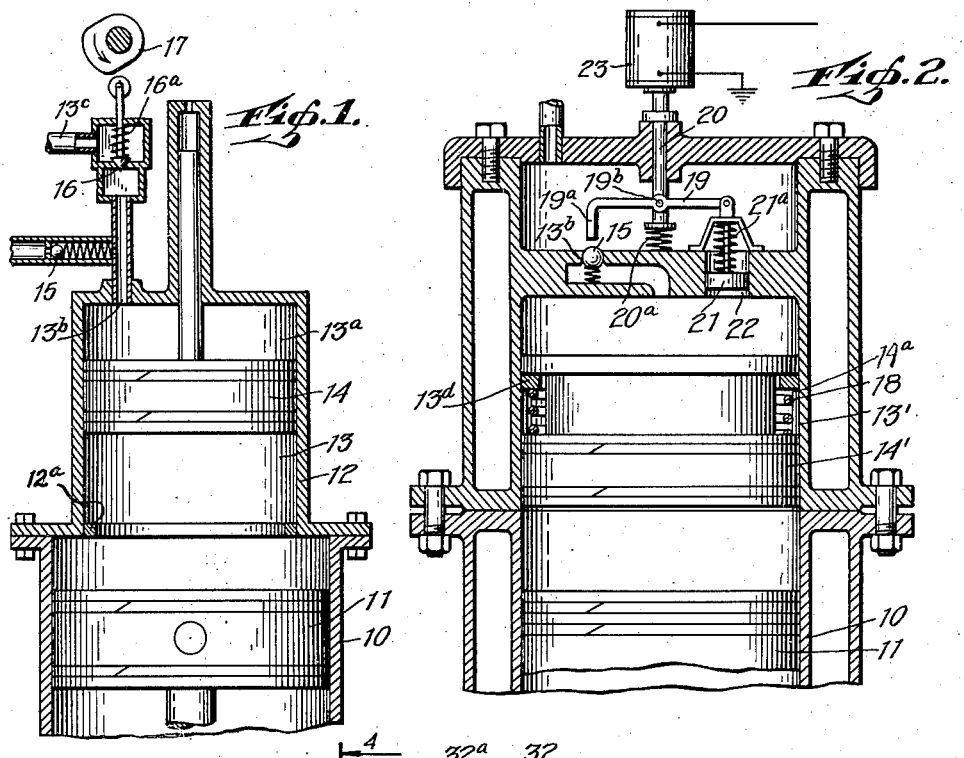
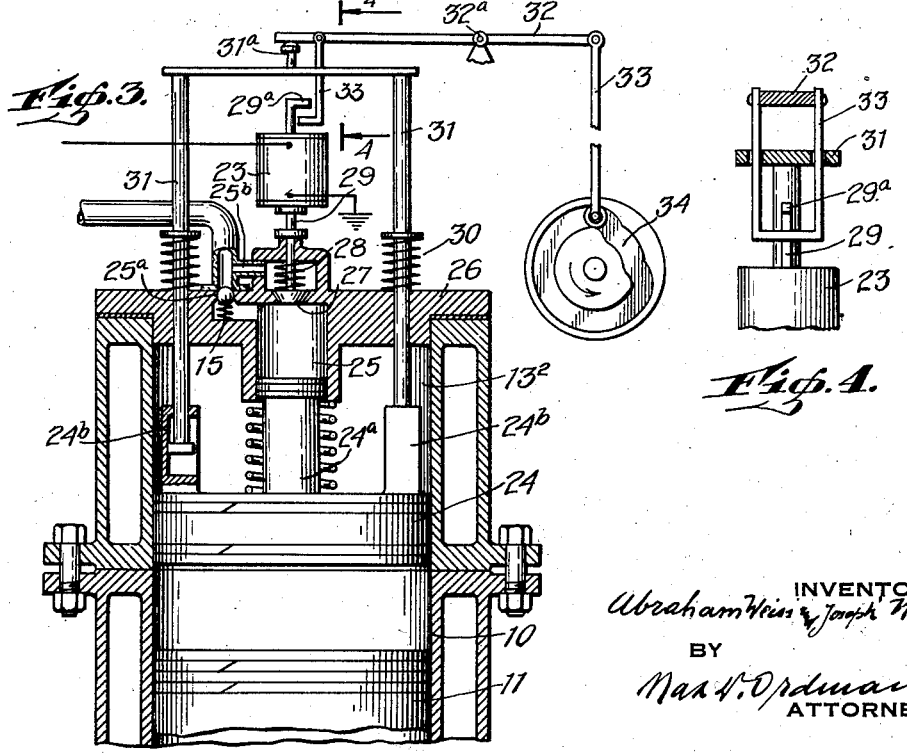
INVENTORS
Abraham Weiss & Joseph Weiss
BY
Max V. Ordmann
ATTORNEY Jan. 14, 1947.　　A. WEISS ET AL　　2,414,217
INTERNAL-COMBUSTION ENGINE
Filed Nov. 17, 1942　　　2 Sheets-Sheet 2
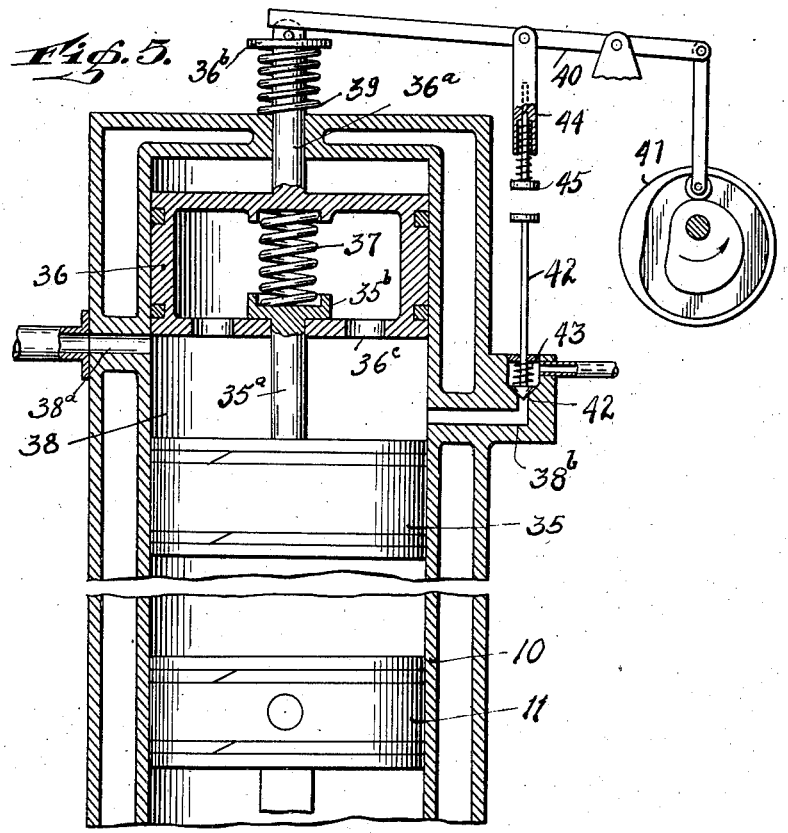
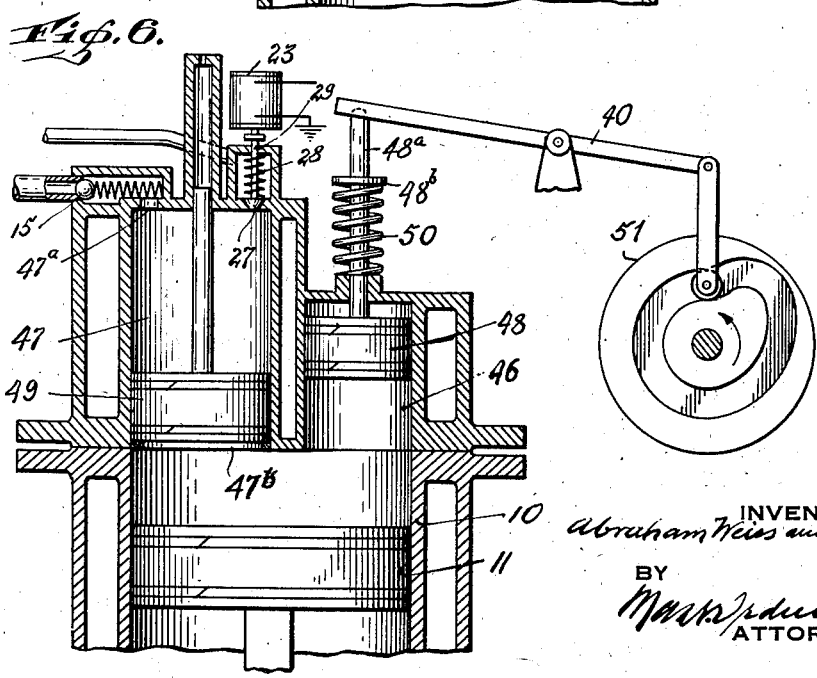

Patented Jan. 14, 1947

2,414,217

UNITED STATES PATENT OFFICE 2,414,217

INTERNAL-COMBUSTION ENGINE

Abraham Weiss and Joseph Weiss,
New York, N. Y.

Application November 17, 1942, Serial No. 465,928

3 Claims. (Cl. 123—78)

This invention relates to internal combustion engines for motor vehicles and has for its main object the provision of a construction whereby the efficiency of the engine will be considerably enhanced.

It is well known that with such engines, as at present in use, the efficiency is limited because of the fixed volume of the explosion chamber, so that after attaining a maximum efficiency by a certain charge of fuel, an increase of the charge will lower the efficiency of the engine. This drawback is obviated by our present invention according to which the volume of the combustion chamber is made automatically expansible in order that varying charges of fuel may be compressed in the engine cylinders under constant pressure.

We are aware that attempts have been made to obtain this result by similar methods, but to our knowledge none were successful because of the faulty construction of the means for controlling the variation of the combustion chamber.

Other objects of our invention will be apparent from the detailed description thereof, by referring to the accompanying drawings in which similar reference characters denote corresponding parts and in which:

Figure 1 is a more or less diagrammatic sectional elevation of an internal combustion engine having a cylinder provided with an auxiliary reciprocatory piston and means for controlling the movement thereof during compression so as to produce constant pressure after the effective compression ratio is reached.

Figures 2 and 3 are similar elevations of modified forms of construction of said engine to produce the same effect as that obtained with the construction shown in Figure 1.

Figure 4 is a section on line 4—4 of Figure 3.

Figure 5 is a similar section of a modification of an internal combustion engine having a reciprocatory piston and means for controlling the movement thereof to enlarge the intake volume of the fuel during intake and to compress the same to an extent causing self-ignition.

Figure 6 is a similar sectional elevation of modification of an internal combustion engine having two independently reciprocating pistons and means for controlling the movements thereof so as to enlarge the intake volume of the fuel during intake, and to compress the same to an extent causing self-ignition.

In the drawings we have shown only one cylinder of an internal combustion engine. It is understood that with multiple cylinder engine each cylinder will be of identical construction.

Referring in detail first to the modification shown in Figure 1, 10 denotes the conventional main cylinder of a multiple cylinder internal combustion engine (one cylinder only being shown), with the piston 11 working therein in the usual manner, and with the usual intake and exhaust valves (not shown). Fixed over the inner end of the cylinder in the usual or any suitable manner is a cylinder head 12, which is provided with an auxiliary cylindrical chamber 13, arranged in axial extension of each main cylinder, and in which works an auxiliary piston 14 provided with the usual piston rings. An annular rib 12a is provided at the lower end of said chamber 13 to serve as a stop for limiting the outer movement of said auxiliary piston 14. The space 13a behind said auxiliary piston 14 is adapted to be filled with a non-compressible fluid, such as oil, from a reservoir (not shown) through a passage 13b leading into it at the rear or upper closed end of said chamber. This passage is controlled by a suitable valve 15, such as a spring actuated ball valve. Another passage 13c leads from said rear end of chamber 13 back into said reservoir and is controlled by a needle valve 16 actuated by a spring 16a whose force is designed to hold said valve tightly closed under any pressure less than that of the effective compression ratio, say 175 lbs. or whatever it may be. 17 denotes a timing cam operated from the main shaft of the engine in any suitable manner (not shown) and adapted to force the valve 16 back onto its seat at the instance the main piston 10 has reached the end of its compression stroke and before the firing occurs.

The operation is as follows:

Normally the space behind the auxiliary piston is filled with the non-compressible fluid such as oil, and the valves 15 and 16 are closed so that the fluid is trapped in the chamber 13a. As a result thereof the auxiliary piston 14 is held at the forward or lower end of chamber 13, during the intake stroke and part of the compression stroke of the main piston 10. When the effective compression ratio is reached the corresponding pressure of the trapped fluid will overcome the spring force of the needle valve 16, permitting the fluid to escape through passage 13c, so that the auxiliary piston 14 will now move inwardly in chamber 13, thereby maintaining constant the effective compression ratio up to the instant the piston 10 arrives at the end of its compression stroke. At that instant the cam 17 acts on the valve 15 reseating it, and arresting the auxiliary piston during the firing. After the expansion stroke the cam 17 unlocks the valve 16, which, however, remains closed under its spring force until the effective compression ratio is reached in the succeeding cycle.

After expansion and during exhaust, the fluid will be permitted to enter the chamber 13a through the passage 13b, whose check valve 15 will open under pressure of the fluid in the reservoir, so that the auxiliary piston 14 will be caused to move back to the forward or initial position thereby aiding in the expulsion of the exhaust gases.

It will be seen from the foregoing description of operation of the engine, that the efficiency of the latter can be considerably enhanced by constructing it in accordance with our invention. The construction may however, be modified in various ways without departing from the principle on which our invention is based.

Thus, for instance, according to the modification shown, in Figure 2, the auxiliary piston 14¹ normally is held in initial or forward end of the chamber 13¹ by a spring 18 which may be mounted in an annular groove 14a thereof, to bear against a flange 13d of the chamber 13¹. The ball valve 15 controlling the inlet passage 13b may be actuated automatically by the nose 19a of a rock lever 19 pivoted to a movable member 20 supported by a pull spring 20a on the rear wall of said chamber 13¹. The opposite end of said rock lever may be operatively connected to a spring actuated plunger 21 slidably mounted in a channel 22 opening in said chamber 13¹. When the fluid contained in the space of the chamber 13¹ behind the auxiliary piston 14¹ is compressed under the pressure of the effective compression ratio, the spring 21a of the plunger 21 will yield and said plunger 21 will move inwardly in channel 22 and thereby swing the rock lever 19 so as to unseat the valve 15 and permit the fluid to be forced back into the reservoir, so that the auxiliary piston 14¹ will be allowed to move in synchronism with the main piston 10 under constant pressure.

The outer end of member 20 is adapted to act as armature of a solenoid 23. This solenoid is adapted to be energized by an electric circuit controlled through a time controlled make and break mechanism similar to the conventional spark distributor mechanism (not shown). When this solenoid is energized, which will occur at the instant the piston 10 reaches the firing position, the member 20 will be attracted i. e. moved from its normal position against the tension of its pull spring. By that movement the fulcrum 19b of the rock lever will be displaced so that the movement of the plunger 21 in the channel 22 will not affect the valve 15 which will instantaneously close trapping the fluid in chamber 13¹ and arresting the auxiliary piston 14¹.

The operation is as follows:

During the compression stroke of the main piston 11 in the cylinder 10 the auxiliary piston 14¹ will at first be stationary, because of the fluid being trapped within the chamber 13¹ by the closed valve 15. At the instant the effective compression ratio for the maximum efficiency is reached, the spring 21a will yield allowing the plunger 21 to move inwardly. This movement will cause the rock lever 19 to unseat the ball valve 15 permitting the fluid to be forced back into its reservoir. The auxiliary piston 14¹ will then be permitted to move inwardly under constant compression pressure.

At the instant the main piston 11 reaches the end of the compression stroke or the firing position, the solenoid 23 will be energized. This will cause the member 20 to be attracted thereby displacing the fulcrum 19b of rock lever 19 and releasing the valve 15 permitting the latter to close under its spring force and trapping the fluid in said chamber 13¹. The fluid thus trapped will act as brake against the auxiliary piston 14¹ preventing its further movement. After the firing stroke the solenoid 23 will be disenergized and member 20 return to normal position.

During the exhaust and subsequent intake the relatively weak spring 18 will move the piston 14¹ to its initial end position.

In the modification according to Figure 3 the auxiliary chamber 13² movably bears a piston 24 provided with a central inwardly projecting extension 24a. This extension projects into and movably bears in a liquid chamber 25 provided in the rear or upper closed wall or lid 26 of the chamber 13². Leading from the fluid reservoir into this liquid chamber is the passage 25a controlled by a spring actuated inlet valve 15. Another passage 25b leads from said chamber back into said reservoir. This passage is controlled by a valve 27. This valve is adapted to be held normally closed by a spring 28 and its stem 29 serves as armature of solenoid 23. At its free end this stem is provided with a catch 29a. Movably supported by spring 30 on the upper or rear wall or lid of the chamber 13² is a yoke shaped member 31 which is provided with a central projection or boss 31a. The free ends of said yoke project into the chamber 13² and slidably engage slotted projections 24b of the piston 24 arranged near the periphery of the latter. When moved upwardly or rearwardly this yoke is capable of moving said piston along with it as will be hereinafter described.

A double armed lever 32 pivoted at 32a is suitably connected to a rod 33 which is actuated from a suitable timing cam 34. The free end of said double armed lever when swung toward the yoke 31 is adapted to act against the boss 31a and move said yoke forwardly or downwardly. Pivotally suspended from said lever 32 is a looped member or hook 33 adapted to operatively engage said catch 29a when said lever 32 is swung away from said yoke 31 and unseat the valve 27 against the tension of its spring 28.

The operation is as follows:

At the end of the exhaust and before the commencement of the intake stroke the timing cam 34 causes lever 32 to press down the yoke 31 against its springs 30. The valve 27 will close under the tension of spring 28 and the plunger 24a under the pressure of the fluid from the reservoir entering the chamber 25 will be caused to move outwardly forcing the auxiliary piston 24 to move down toward the main piston 11. As soon as intake commences, the cam 34 will swing the lever 32 away from the yoke 31 as a result of which the looped member 33 in cooperation with catch 29 will raise the valve 27 from its seat. Simultaneously the released yoke 31 will rise under the action of its springs 30, and when the lower ends thereof engage the upper ends of the guides 24b will move the piston 24 inwardly, the fluid being now allowed to return to the fluid reservoir through passage 25b. Thus during intake, while the piston 11 in the main cylinder will move downwardly or outwardly the auxiliary piston 24 will move upwardly or inwardly in chamber 13² thereby enlarging the vacuum space for the intake of fuel mixture.

At the end of intake and commencement of compression lever 32 again is swung down, pressing yoke 31 down. This releases valve 27 which will close under pressure of its spring 28. This traps the fluid under pressure which is entering the chamber 25, through valve 15 to move the plunger 24ª and therefore the auxiliary piston 24 outwardly before piston 11 has actually started to move inwardly and compress the fuel. At the end of its outward stroke, the auxiliary piston will remain stationary until the compression of the fuel in the intake chamber 10 has reached the effective ratio. At that instant the force of spring 28 will yield under the pressure of the fluid in chamber 25 causing valve 27 to open. The lost motion provided between the lower ends of the yoke and the upper ends of the guides 24 will permit the piston 24 to move inwardly in synchronism with the main piston 10 under constant pressure, until the end of the compression stroke of the main piston. At that instant the distributor switch (not shown) closes the electric circuit through the solenoid 23, which causes valve 27 to close again and the fluid to enter chamber 25 and move the piston 24 outwardly to initial position.

Immediately after the firing the solenoid is disenergized, but the lever 32 is held down till the end of exhaust. The cycle thereupon repeats itself.

In the modification shown in Figure 5 the auxiliary piston is composed of two movably interengaging sections 35, 36. Section 35, constituting the auxiliary piston proper, is formed with a central neck portion 35ª which projects into the perforated bottom of the hollow section 36. The inner end of the neck 35ª is formed with a flange 35ᵇ, which prevents the disengagement of the two sections 35, 36 from one another and between which and the rear or inner end wall of the section 36 is mounted a spring 37 normally tending to hold the two sections extended. The section 36 is provided with a central rearwardly projecting boss 36ª having a flange 36ᵇ between which and the closed end of the chamber 38 is mounted a spring 39 which normally tends to move the hollow section 36 upwardly or inwardly. Adapted to act against the free end of said boss 39 is a rock lever 40 which as in the modification shown in Figure 3 is adapted to be actuated in suitable manner by a timing cam 41 impelled from the main shaft of the engine. The chamber 38 is provided with two passages 38ª and 38ᵇ, the former leading from and the latter leading back into a non-compressible fluid reservoir (not shown). The passage 38ᵇ is controlled by a needle valve 42 which under the tension of a spring 43 normally holds said valve closed. The perforations 36ᶜ in the bottom of the hollow section 36 permit the passage of the fluid into the latter.

Suspended from the rock lever 40 is a push member 44 which at its free end carries a spring actuated plunger 45 capable when the lever is in active position to engage the free end of the stem 42ª of the needle valve 42 and to lock the same, as will be presently described.

The operation is as follows:

During the intake stroke of the main piston 10 the rock lever 40 will be up or away from the boss 39, permitting the hollow section 36 of the auxiliary plunger to move inwardly and pull the solid or other section 35 along with it by the collar or flange 35ᵇ, thereby enlarging the intake space of the engine. During that movement the passage 38ª will become exposed so that fluid that may have been previously expelled may be replenished in chamber 38 between the two sections of the auxiliary piston.

At the end of the intake stroke and at the commencement of the compression stroke the rock lever will be swung to act against the boss 39 and force the hollow section 36 outwardly, closing the passage 38ª and causing the other section 35 to move outwardly under the pressure of the fluid trapped between the two sections. At the same time the push member 44 will reach the free end of the stem 42ª of valve 42. Owing to resiliency of the plunger 45 of the push rod 44, the valve 42 will, at first, thereby not become locked, so that when the effective compression ratio is reached the spring 43 of the valve 42 may yield, to permit the escape of the fluid through the passage 38ᵇ. At that instant the auxiliary piston will be permitted to move inwardly thereby maintaining the compression pressure constant until the end of the compression stroke or the firing. At that instant the cam 41 will impart a slight further downward movement to the rock lever 40, forcing section 36 outwardly to raise the compression to self-ignition, and whereby the plunger 45 will be completely forced down against the valve stem 42ª and thereby lock said valve 42 in closed position. The trapped fluid will instantaneously arrest the piston. The valve 42 will remain closed and locked until after the exhaust, when the lever 40 will again swing away from the boss 39 permitting spring 39 to pull the auxiliary piston inwardly as hereinbefore described, repeating the cycle.

In the modification according to Figure 6, we provide two auxiliary chambers 46, 47 in which reciprocate independently of one another auxiliary pistons 48, 49 respectively. An annular rib 47ᵇ is provided at the lower end of chamber 47 to serve as a stop for limiting the outer movement of said auxiliary piston 49. The chamber 47 behind the auxiliary piston 49 is adapted to be filled with non-compressible fluid from a reservoir (not shown) through a passage 47ª, controlled by ball valve 15, and has a second passage 47ᵇ leading back into said reservoir and controlled by a needle valve 27 acted upon by spring 28 and whose stem 29 serves as armature of a solenoid 23 similar to the modification shown in Figure 3. The second auxiliary piston 48 is provided with a piston rod 48ª and is adapted to normally move inwardly under the tension of spring 50 mounted between the closed rear end of the chamber 46 and a collar 48ᵇ. The free end of said piston rod is adapted to be acted upon by the rock lever 40 operated by a timing cam 51, as will be presently described. The operation is as follows:

During intake the cam 51 swings lever 40 away from piston rod 48ª permitting auxiliary piston 48 to move inwardly under action of its spring 50, thereby enlarging intake volume of the fuel mixture. During that period the valves 15 and 27 being closed in chamber 47 trap the fluid behind the auxiliary piston 49 and hold it in its lower end position. During a portion of the compression stroke the piston 49 remains stationary until the effective compression ratio is reached. At that instant the spring 28 of the valve 27 yields untrapping the fluid, so that the piston 49 can now move inwardly in synchrony with the piston 11 in main cylinder, maintaining the pressure constant. When the main piston reaches the end of the compression stroke or the firing position, the solenoid 23 is energized and locks the valve 27 on its seat. At the same instant the lever 40 is rocked to depress the second auxiliary piston 48 in chamber 46 and thereby raise the compression pressure to self-ignition. At the end of the firing stroke the solenoid 23 is disenergized. Due to the drop of pressure in the combustion chamber the fluid entering under a certain pressure the chamber 47 through the passage 47ª will force the piston 49 down thereby aiding in the expulsion of the exhaust gases.

The piston 49 may be properly guided in the chamber 47 by any suitable means.

By this last described modification, spark plugs, distributor make and break mechanism and other parts at present required to produce ignition can be entirely eliminated.

To prevent the fluid from escaping into the combustion chamber or air and gases passing into the fluid chamber and forming bubbles therein, suitably controlled escape vents (not shown) may be provided in the auxiliary chambers.

It is, of course, obvious that various other modifications may be made in the construction of internal combustion engines without departing from the principle of our invention and we therefore, do not wish to limit ourselves to the details described and shown.

What we claim is:

1. In an internal combustion engine, the combination with its cylinder and piston, of a chamber in extension of the inner end of said cylinder, a reciprocatory member working in said chamber, a valve controlled means for admitting non-elastic fluid under pressure from a flow passage into the inner end of said chamber, said valve controlled means preventing return flow of said fluid, a spring loaded valve controlling a second flow passage for said non-elastic fluid, the loading of said valve serving normally to maintain said valve closed and to preclude return flow through said second passage until a predetermined counter-pressure is exerted upon said reciprocatory member from below the closed end of said chamber, and time controlled means in timed relation with said engine operable on said spring loaded valve for closing the latter in opposition to said counter-pressure.

2. In an internal combustion engine, according to claim 1, in which means are provided for raising the compression pressure at the end of the compression stroke to cause self-ignition of the fuel.

3. In an internal combustion engine, the combination with its cylinder and piston, of a chamber in extension of the inner end of said cylinder and divided into two compartments, a reciprocating member in each compartment, means for establishing fluid pressure behind the reciprocatory member in one of said compartments so as to hold the member therein stationary during a portion of the compression stroke of said piston, means in timed relation with the engine for relieving said pressure at the instant the effective compression ratio is reached to permit said member to move inwardly under constant pressure, timing means for reestablishing fluid pressure behind said member at the end of the compression stroke to again hold said member stationary during firing, means in timed relation with the engine tending to move the member in the other compartment inwardly during the intake stroke so as to enlarge the volume of the fuel charge and timing means for positively moving said second member outwardly at the end of the compression stroke of said piston to raise the compression of the fuel to self-ignition.

ABRAHAM WEISS.
JOSEPH WEISS.